United States Patent
Ding et al.

(10) Patent No.: US 11,528,925 B2
(45) Date of Patent: Dec. 20, 2022

(54) ANTIFREEZE SOLUTION FOR FOOD PRESERVATION

(71) Applicants: Hangzhou Qiandao Lake Development Group Co., Ltd., Hangzhou (CN); Zhejiang University of Technology, Hangzhou (CN)

(72) Inventors: Yuting Ding, Hangzhou (CN); Shulai Liu, Hangzhou (CN); Zhenyu Zhang, Hangzhou (CN); Jianmin Wang, Hangzhou (CN); Guangxi He, Hangzhou (CN); Hongzheng Yao, Hangzhou (CN)

(73) Assignees: HANGZHOU QIANDAO LAKE DEVELOPMENT GROUP CO., LTD., Hangzhou (CN); ZHEJIANG UNIVERSITY OF TECHNOLOGY, Hangzhou (CN)

( * ) Notice: Subject to any disclaimer, the term of this patent is extended or adjusted under 35 U.S.C. 154(b) by 717 days.

(21) Appl. No.: 16/452,516

(22) Filed: Jun. 25, 2019

(65) Prior Publication Data
US 2019/0387773 A1 Dec. 26, 2019

(30) Foreign Application Priority Data
Jun. 25, 2018 (CN) .......................... 201810664876.4

(51) Int. Cl.
| | | |
|---|---|---|
| A23L 3/3472 | (2006.01) | |
| A23L 3/349 | (2006.01) | |
| A23L 3/3526 | (2006.01) | |
| A23L 3/358 | (2006.01) | |

(52) U.S. Cl.
CPC ............ *A23L 3/3472* (2013.01); *A23L 3/349* (2013.01); *A23L 3/358* (2013.01); *A23L 3/3526* (2013.01); *A23V 2002/00* (2013.01); *A23V 2200/206* (2013.01); *A23V 2250/0604* (2013.01); *A23V 2250/0606* (2013.01); *A23V 2250/0622* (2013.01); *A23V 2250/1578* (2013.01); *A23V 2250/1582* (2013.01); *A23V 2250/1614* (2013.01); *A23V 2250/542* (2013.01); *A23V 2300/28* (2013.01); *A23V 2300/34* (2013.01)

(58) Field of Classification Search
CPC .. A23L 3/3472; A23L 13/349; A23L 13/3526; A23L 3/358; A23L 3/349; A23L 3/3526
USPC ........................................................ 426/265
See application file for complete search history.

(56) References Cited

U.S. PATENT DOCUMENTS

| | | | | |
|---|---|---|---|---|
| 4,968,520 A | * | 11/1990 | Wang | A23B 4/066 426/524 |
| 2008/0199583 A1 | * | 8/2008 | Liberman | A23B 7/05 426/524 |
| 2009/0054626 A1 | * | 2/2009 | Chiba | A23L 3/3526 530/422 |
| 2009/0114876 A1 | * | 5/2009 | Garcia | C09K 3/18 252/70 |
| 2011/0039699 A1 | * | 2/2011 | Moratiel Yugueros | C09K 3/18 504/118 |
| 2017/0295777 A1 | * | 10/2017 | Wei | A61K 8/88 |

FOREIGN PATENT DOCUMENTS

| | | |
|---|---|---|
| CN | 102241964 A | 11/2011 |
| CN | 102719229 A | 10/2012 |
| CN | 103087683 A | 5/2013 |
| CN | 103689061 A | 4/2014 |

OTHER PUBLICATIONS

NPL Wohrmann et al. (in Mar Ecol Prog Ser 130: 47-59, 1996) (Year: 1996).*
NPL Cui et al. (in China Particuology vol. 3, No. 6 pp. 343-348, 2005) (Year: 2005).*
NPL Junhui et al. (English translation of CN 104450163 (A)—Mar. 25, 2015). (Year: 2015).*
NPL Brine salt concentration (Retrieved on Feb. 9, 2022). (Year: 2022).*
NPL vol. to weight conversion (Retrieved on Feb. 9, 2022). (Year: 2022).*
Google search retrieved on Feb. 9, 2022. (Year: 2022).*

* cited by examiner

*Primary Examiner* — Donald R Spamer
*Assistant Examiner* — Bhaskar Mukhopadhyay
(74) *Attorney, Agent, or Firm* — Bayramoglu Law Offices LLC

(57) ABSTRACT

The present invention discloses an antifreeze solution for food preservation, which comprises edible alcohol, propylene glycol, glycerin, calcium chloride, sodium chloride, amino acid, Antarctic krill protein hydrolysate with an average molecular weight of 50-100 KDa, surfactant and water, wherein the surfactant is one or more of phospholipid, Tween-20, Tween-60, and Tween-80; each component is food grade, and the mass percentage is expressed as follows: alcohol 15-30%, propylene glycol 10-30%, glycerol 2-15%, calcium chloride 1-10%, sodium chloride 3-10%, amino acid 0.1-0.15%, Antarctic krill protein hydrolysate 0.01-0.3%, surfactant 0.005-0.5%, and the balance is water. The antifreeze solution provided by the present invention can lower the freezing point, improve the heat transfer efficiency, inhibit the crystallization of antifreeze solution during the low temperature stirring process and improve the stability of the antifreeze solution.

7 Claims, 2 Drawing Sheets

ANTIFREEZE SOLUTION FOR FOOD PRESERVATION

CROSS-REFERENCE TO RELATED APPLICATIONS

This Non-provisional application claims priority under 35 U.S.C § 119(a) on Chinese Patent Application No(s). 201810664876.4 filed on Jun. 25, 2018, the entire contents of which are hereby incorporated by reference.

BACKGROUND OF THE INVENTION

Field of the Invention

The present invention belongs to the field of food preservation and freezing process, and relates to an antifreeze solution against freeze crystallization used for rapidly freezing fresh food.

Description of the Related Art

Freezing of antifreeze solution, also know as immersion freeze, is a highly efficient method of rapid freezing of aquatic products by directly or indirectly contacting the aquatic product with the brine and rapidly cooling and freezing after heat exchange with the brine. Compared with the traditional freezing method, such as blast freezing, flat freezing, etc., it has the advantages of short freezing time, fast freezing rate and low energy consumption. The choice of antifreeze solution directly determines the quality of the frozen product. Therefore, choosing a good performance antifreeze solution is the key to the freeze-free processing technology. The antifreeze solution used for freezing of aquatic products must have the characteristics of low freezing point, large heat transfer coefficient and small viscosity; secondly, it requires stable nature, green safety and no harm to the human body.

At present, most commonly used antifreeze solutions are sodium chloride aqueous solution, calcium chloride aqueous solution, and ethylene glycol aqueous solution or sugar aqueous solution. The early use of antifreeze solution is mostly cold brine, which is often used to cool and freeze aquatic products such as shrimp and tuna. High-concentration brine will not only penetrate into aquatic products but also cause serious corrosion to equipment. The mixed solution of sugar and sodium chloride is mostly used for cooling and freezing of some fruits and vegetables, and has the disadvantages of high viscosity and high freezing point. Ethylene glycol solution is widely used in industrial production, hut it has certain toxicity, can not be used at high concentration, and has poor economy.

When the antifreeze solution is in a supersaturated state, the solute in the solution will form fine crystals at a low temperature, and such a process is a crystal nucleation process (primary nucleation). Primary nucleation is mostly heterogeneous nucleation. In the presence of certain impurities, the energy required for nucleation is greatly reduced. Heterogeneous nucleation generally occurs at relatively low supersaturation, and the free energy reduction in this case depends on the contact angle of the solid phase.

Secondary nucleation occurs after nucleation of the non-frozen solution crystal. At high-speed agitation, microscopic erosion or collision or friction of the crystal can result in the formation of small particle crystals. These mechanisms for forming crystal nuclei are called contact nucleation, in which case the crystal grows and becomes larger. Contact nucleation mainly includes three ways: crystal-crystal, crystal-agitator, and crystal-wall.

Antarctic krill (*Euphausia superba*) is a small pelagic marine animal living in the Antarctic waters. It has a huge amount of biological resources and is currently in a state of insufficient development and utilization. Since Antarctic krill lives in the cool Antarctic waters (water temperature is about −1.9° C.), in order to adapt to the harsh low temperature environment in the Antarctic waters, Antarctic krill adaptively produces antifreeze active substances, which can destroy the crystal microstructure and inhibit the nucleus propagates, reduces the number of nucleation, and has good resistance to crystallinity.

In recent years, some research inventions have disclosed new formulations of antifreeze solution for food freezing, such as:

1) China Patent No. 201210558113.4 discloses a ternary coolant for food immersion freezing which is composed of ethanol, propylene glycol and water. Its low temperature working temperature is −30° C. to −40° C. The brine contains 10 to 30% ethanol, 18 to 43% propylene glycol, and 47% water by mass percentage.

2) China Patent No. 201210196843.4 discloses a frozen solution for direct immersion freezing of food, which mainly comprises the following components of mass percentage: betaine 18-25%; edible alcohol 15-20% with a concentration of more than 95%; sodium chloride 2 to 8%; water 47 to 65%. Betaine is used as a major component of the frozen solution.

3) China Patent No. 201110174042.3 discloses quaternary brine for food immersion freezing, which is composed of ethanol, sodium chloride, water and water-soluble protein. When the immersion freezing working temperature is above −20° C., the components of the brine are: ethanol, 5% to 8%, sodium chloride 20%, water-soluble protein 0.5%, and the balance is water; when the immersion freeze is Above −30° C., the composition of the brine is: ethanol 23%-25%, sodium chloride 14%-20%, water-soluble protein 0.5%, the balance is water; when the immersion freeze temperature is −40° C. to −44° C., the components of the brine are: ethanol 43% to 55%, sodium chloride 5 to 14%, water-soluble protein 0.3 to 0.5%, and the balance is water.

There are some shortcomings in the existing antifreeze solution composed of binary, ternary, quaternary and other coolant:

1) The existing antifreeze solution contain high concentration of sodium chloride, it has corrosive effect on equipment, and equipment maintenance is difficult;

2) The ethanol concentration is high and it is easy to volatilize. When the antifreeze solution is stored for a long time, the evaporation amount is high, causing the freezing point to rise;

3) The high content of sugar alcohols causes the viscosity of the antifreeze solution to be high, which affects heat transfer;

4) When the antifreeze solution is stirred at a low temperature, freeze crystallization will occur and the heat transfer performance will be significantly reduced.

5) When the antifreeze solution is used for a long time at a low temperature, substances such as salts and the like may be precipitated, causing the freezing point to rise, the nature to be unstable, and the economic benefit to be deteriorated.

In response to these problems, the present invention provides a method for preparing an antifreeze solution against freeze crystallization for food preservation.

BRIEF SUMMARY OF THE INVENTION

The purpose of the present invention is to overcome the deficiencies in the prior art, to provide an antifreeze solution which can be used for rapid freezing of food, to reduce the freezing point of the antifreeze solution, improve the heat transfer efficiency, inhibit the occurrence of crystallization during low temperature stirring, and improve the stability of the antifreeze solution.

The technical solution adopted by the present invention to solve the technical problem thereof is:

An antifreeze solution for food preservation comprises edible alcohol, propylene glycol, glycerol, calcium chloride, sodium chloride, amino acid, Antarctic krill protein hydrolysate with an average molecular weight of 50-100 KDa, surfactant and water. The surfactant is one or more of phospholipid, Tween-20, Tween-60, and Tween-80; each component is food grade, and the mass percentage content is expressed as follows:

| | |
|---|---|
| Edible alcohol | 15-30% |
| Propylene glycol | 10-30% |
| Glycerol | 2-15% |
| Calcium chloride | 1-10% |
| Sodium chloride | 3-10% |
| Amino acid | 0.1-0.15% |
| Antarctic krill protein hydrolysate | 0.01-0.3% |
| Surfactant | 0.005-0.5% |
| Water | The balance |

Further, the mass percentage of propylene glycol is preferably 10-20%.

Further, the mass percentage content of glycerin is preferably from 2 to 5%.

Further, the mass percentage of calcium chloride is preferably from 1 to 5%.

Further, the Antarctic krill protein hydrolysate is made from Antarctic krill, firstly using papain (Nanning Pangho Biological Engineering Co., Ltd., enzyme activity 1 million U/g) to obtain an Antarctic krill crude protein hydrolysate. Then, an ultrafiltration membrane having a membrane pore molecular weight of 100 KDa and a membrane pore molecular weight of 50 KDa was sequentially passed to obtain a protein hydrolyzate having an average molecular weight of 50 to 100 kDa. The Antarctic krill protein hydrolysate of 50-100 KDa has anti-crystallization effect at low temperature, and inhibits the production of frozen nucleus of cryopreservation solution at low temperature.

Further, papain enzymatically hydrolyzes, and the amount of enzyme added is 1000 U/g protein, and the enzymatic hydrolysis conditions are: enzymatic hydrolysis at 40° C., pH 6.5 for 3 h.

Further, the amino acid is selected from one or a combination of any one of the following: one or more of glycine, alanine, and arginine.

Further, the water may be tap water, distilled water, purified water or the like.

Further, the antifreeze solution is composed of edible alcohol, propylene glycol, glycerin, calcium chloride, sodium chloride, amino acid, Antarctic krill protein hydrolysate having an average molecular weight of 50 to 100 KDa, a surfactant, and water.

The antifreeze solution for food preservation according to the present invention is prepared by first dissolving salt, amino acid substance and surfactant in water, and adding food alcohol, propylene glycol, glycerin and Antarctic krill protein hydrolyzate to be stirred. Use evenly.

Compared with the prior art, the present invention has the following features:

1) The formula of antifreeze solution used in the present invention completely adopts substances, which do not have any harm to human health, and meets the requirements of food safety.

2) The antifreeze solution of the present invention reduces the content of sodium chloride or calcium chloride, reduces the corrosion of the instrument, and replaces the ethylene glycol used industrially with propylene glycol, which is more environmentally friendly.

3) Adding a small amount of 50-100 KDa Antarctic krill protein hydrolysate not only reduces the freezing point of the solution, but also improves the heat transfer efficiency, and inhibits the crystallization phenomenon of the antifreeze solution during the stirring process.

4) Adding a small amount of surfactant, through the van der Waals force and hydrogen bonding between the surfactant and the alcohol, the volatility of the alcohol in the antifreeze component can be effectively reduced, so that the antifreeze solution system is more stable.

5) The antifreeze solution of the invention has a minimum freezing point up to −45° C., with a moderate viscosity, less volatilization, stable performance, and different ratios can be selected according to the required temperature.

DETAILED DESCRIPTION OF THE INVENTION

The specific implementation of the present invention will be further described below in conjunction with the embodiments.

The antifreeze solution is formulated with raw material of edible alcohol (95%), food grade propylene glycol, food grade glycerol, food grade calcium chloride, edible sodium chloride, food grade amino acids, Antarctic krill protein hydrolysate, food grade surfactants and tap water.

EXAMPLE 1 PREPARATION OF ANTARCTIC KRILL PROTEIN HYDROLYSATE 100 kg of Antarctic krill is used as raw material. Firstly, it is enzymatically hydrolyzed with papain. The amount of enzyme is 1000 U/g protein, and the crude protein hydrolysate solution of Antarctic krill is obtained by enzymatic hydrolysis at 40° C. and pH 6.5 for 3 h. Then the crude protein hydrolysate solution of Antarctic krill is sequentially passed through an ultrafiltration membrane having a membrane pore diameter of 100 KDa and a membrane pore molecular weight of 50 KDa. The obtained protein hydrolysate has an average molecular weight of 50 to 100 kDa.

EXAMPLE 2

The components of an antifreeze solution for food preservation are as follows by mass percentage: 95% edible alcohol 15%, propylene glycol 10%, glycerol 2%, sodium chloride 3%, calcium chloride 1%, glycine 0.1%, Antarctic krill protein hydrolysate 0.014%, phospholipid 0.1%, balance water. The preparation method comprises the following steps: firstly dissolving 300 g of sodium chloride, 100 g of calcium chloride, 10 g of glycine and 10 g of phospholipid with 6878.6 g of water, and adding 1500 g of edible alcohol, 1000 g of propylene glycol, 200 g of glycerin and 1.4 g of Antarctic krill protein hydrolyzate, and uniformly stirring. Obtain an antifreeze solution. The obtained antifreeze solution has a freezing point of −25° C., with good fluidity and a viscosity of 46.8 mPa·S, which is lower in viscosity and less volatile than the ternary brine invented by Zhu Zhiwei et al. [China Patent No. 201210558113.4]. Freeze crystallization does not occur in this antifreeze solution when stirred rapidly at low temperatures.

Figure 3:
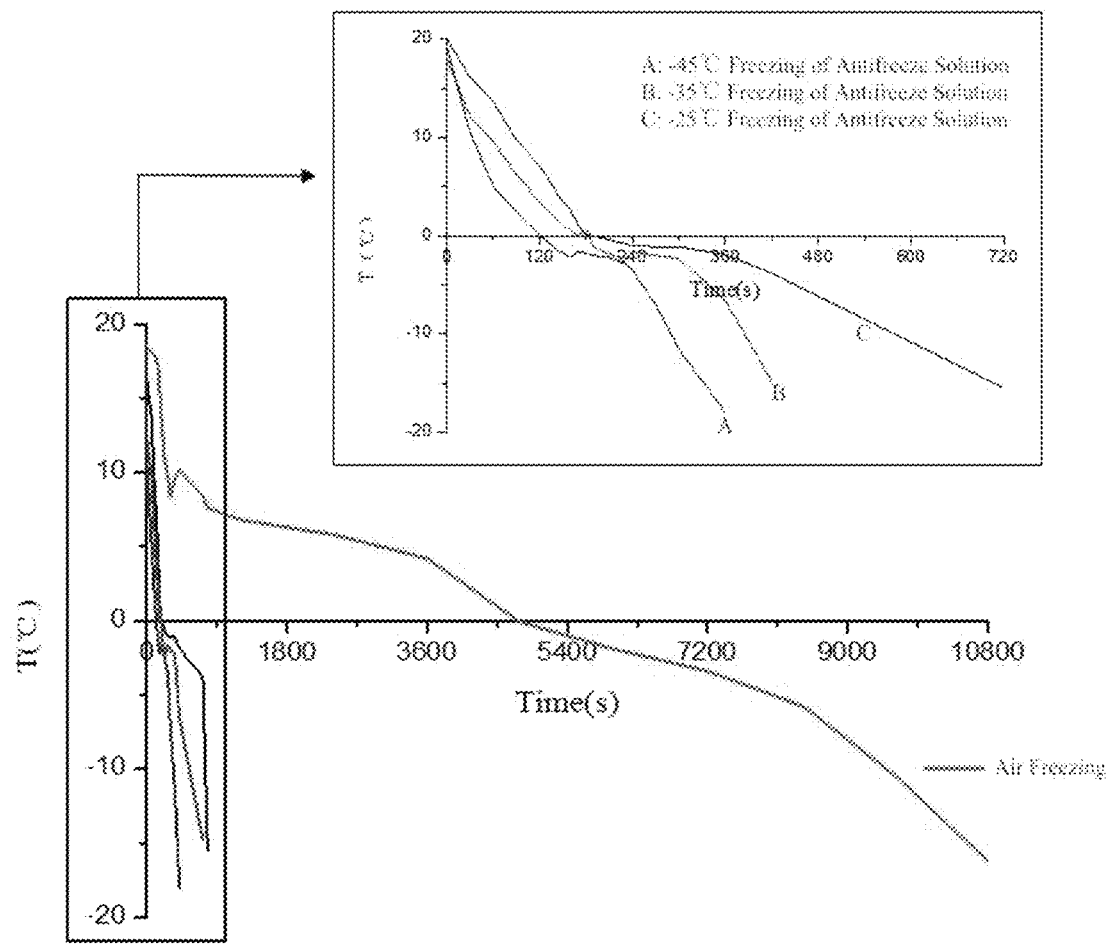
FIG. 3 shows the freezing curve of the fish pieces frozen at different temperatures.

The 4×4×4 (length×width×height) size fish pieces are frozen to a central temperature of −18° C. And the freezing of the present antifreeze solution only takes 12.5 minutes, while the conventional flat air freezing requires more than 180 minutes. The freezing curve is shown in FIG. 3.

Similarly, 2×2×2 (length×width×height) size beef is frozen to a central temperature of −15° C., and the freezing of the present antifreeze solution only takes 6 minutes, while conventional flat air freezing requires more than 100 minutes.

The thermometer probe is inserted into the center of the bayberry (2 cm in diameter), and the temperature of the bayberry center is frozen to −10° C. The freezing of the antifreeze solution of the present invention only needs 4.5 min, while the conventional flat air freezing requires more than 60 min.

EXAMPLE 3

The components of an antifreeze solution for food preservation are as follows by mass percentage: 95% edible alcohol 20%, propylene glycol 15%, glycerol 4%, sodium chloride 4%, calcium chloride 2%, alanine 0.12%, Antarctic krill protein hydrolysate 0.30%, Tween (20) 0.15%, the balance is water. The preparation method comprises the following steps: firstly dissolving 400 g of sodium chloride, 200 g of calcium chloride, 12 g of alanine and 15 g of Tween (20) with 5443 g of water, and then adding 2000 g of edible alcohol, 1500 g of propylene glycol, 400 g of glycerin and 30 g of Antarctic krill protein hydrolysis. The mixture was uniformly stirred to obtain an antifreeze solution. The obtained antifreeze solution has a freezing point of −35° C., with good fluidity at low temperatures and a viscosity of 185 mPa·s. Compared with the quaternary coolant antifreeze solution invented by Qin Haijie [China Patent No. 201110174042.3], it has less volatilization and lower salt content, which has less corrosion to equipment. Freezing crystallization does not occur in the present antifreeze solution when stirred rapidly at low temperatures.

The 4×4×4 (length×width×height) size fish pieces are frozen to a central temperature of −18° C., and the freezing of the present antifreeze solution only takes 7.2 minutes, while the conventional flat air freezing requires more than 180 minutes. The freezing curve is shown in FIG. 3.

The 2×2×2 (length×width×height) size beef is frozen to a central temperature of ×15° C., and the freezing of the present antifreeze solution only takes 3 minutes, while the conventional flat air freezing requires more than 100 minutes.

The thermometer probe is inserted into the center of the bayberry (2 cm in diameter), and the temperature of the bayberry center is frozen to −10° C. The freezing of the antifreeze solution of the present invention takes only 2 minutes, while the conventional flat air freeze requires more than 60 minutes.

EXAMPLE 4

The components of an antifreeze solution for food preservation are as follows by mass percentage: 95% edible alcohol 25%, propylene glycol 20%, glycerol 5%, sodium chloride 6%, calcium chloride 4%, arginine 0.15%, Antarctic krill protein hydrolysate 0.18%, phospholipid 0.12%, Tween (60) 0.15%, the balance is water. The formula is based on the percentage of the total weight of the antifreeze solution. The preparation method comprises the following steps: firstly dissolving 600 g of sodium chloride, 400 g of calcium chloride, 15 g of arginine, 12 g of phospholipid and 15 g of Tween (20) with 3940 g of water, and adding 2500 g of edible alcohol, 2000 g of propylene glycol, 500 g of glycerin, 18 g of Antarctic krill protein hydrolysis, stirring evenly to obtain an antifreeze solution. The obtained antifreeze solution has a freezing point of −45° C., with good fluidity at low temperatures and a viscosity of 224.8 mPa·s. Compared with the frozen preservative solution invented by Zhang Linxin [China Patent No. 201310653196.X], it has a lower viscosity at the same temperature, a lower salt content and less corrosion to equipment. Freezing crystallization does not occur when the present antifreeze solution is rapidly stirred at low temperatures.

The 4×4×4 (length×width×height) size fish pieces are frozen to a central temperature of −18° C. The freezing of the present antifreeze solution only takes 6 minutes, while the freezing of the conventional flat air needs about 180 minutes. The freezing curve is shown in FIG. 3.

The 2×2×2 (length×width×height) size beef is frozen to a central temperature of −15° C., and the freezing of the present antifreeze solution only requires 1.8 minutes, while the conventional flat air freezing requires more than 60 minutes.

The thermometer probe is inserted into the center of the bayberry (2 cm in diameter), and the temperature of the bayberry center is frozen to −10° C. The freezing of the present antifreeze solution only takes 1.2 min, while the conventional flat air freezing requires more than 60 min.

The above embodiments are only intended to illustrate the present invention, and the pretection scope of the present invention is not limited to the above embodiments. The objects of the present invention can be achieved by those of ordinary skill in the art according to the above disclosed content and various parameter ranges.

COMPARATIVE EXPERIMENT 1

The components of antifreeze solution A added with the Antarctic krill protein hydrolysate are as follows according to the mass percentage: 95% edible alcohol 26%, propylene glycol 20%, glycerol 5%, sodium chloride 7%, calcium chloride 3%, glycine 0.15%, Antarctic krill protein hydrolysate 0.2%, and the residual is water. The formula is based on the total weight percentage of the antifreeze solution. The preparation method comprises the following steps: firstly dissolving 70 g of sodium chloride, 30 g of calcium chloride and 1.5 g of glycine with 386.5 g of water, adding 260 g of edible alcohol, 200 g of propylene glycol, 50 g of glycerin and 2 g of Antarctic krill protein hydrolyzate, and uniformly stirring to obtain the antifreeze solution A.

The components of antifreeze solution B without Antarctic krill protein hydrolysate are as follows according to the mass percentage: 95% edible alcohol 26%, propylene glycol 20%, glycerol 5%, sodium chloride 7%, calcium chloride 3%, glycine 0.15%, and the residual is water. The formula is based on the total weight percentage of the antifreeze solution. The preparation method comprises the steps of firstly dissolving 70 g of sodium chloride, 30 g of calcium chloride and 1.5 g of glycine in 388.5 g of water, adding 260 g of edible alcohol, 200 g of propylene glycol, and 50 g of glycerin, and uniformly stirring to obtain an antifreeze solution B.

Figure 1:
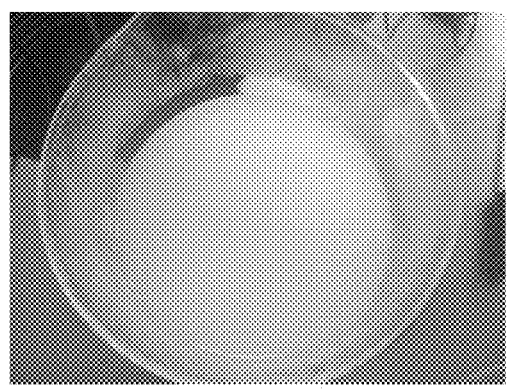
FIG. 1 is a picture of antifreeze solution A added with Antarctic krill protein hydrolysate.
Figure 2:
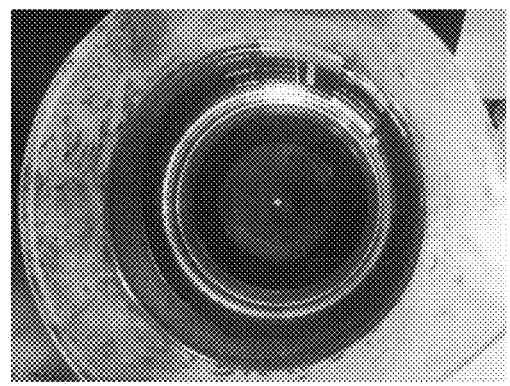
FIG. 2 is a picture of antifreeze solution B without Antarctic krill protein hydrolysate.

Both antifreeze solution A and B are placed at −80° C. to cool down. The antifreeze solution B without Antarctic krill protein hydrolysate has a minimum freezing point of −45.6° C., and the solution crystallizes (FIG. 1). The antifreeze solution A with 0.2% Antarctic krill protein hydrolysate dos not crystallize, moreover the minimum freezing point drops to −47° C.±1.2° C. (FIG. 2).

COMPARATIVE EXPERIMENT 2

The components of antifreeze solution C added with surfactant are as follows according to the mass percentage: 95% edible alcohol 25%, propylene glycol 20%, glycerol 5%, sodium chloride 6%, calcium chloride 2%, glycine 0.15% Tween (20) 0.2%, and the balance is water. The formula is based on the total weight of the antifreeze. The preparation method comprises the steps of first dissolving 60 g of sodium chloride, 20 g of calcium chloride, 1.5 g of glycine and 2 g of surfactant in 416.5 g of water, adding 250 g of edible alcohol, 200 g of propylene glycol, and 50 g of glycerin, and uniformly stirring to obtain an antifreeze solution C.

The components of antifreeze solution D without surfactant are as follows according to the mass percentage: 95% edible alcohol 25%, propylene glycol 20%, glycerol 5%, sodium chloride 6%, calcium chloride 2%, glycine 0.15%, and the balance is water. The formula is based on the total weight percentage of the antifreeze solution. The preparation method comprises the steps of first dissolving 60 g of sodium chloride, 20 g of calcium chloride and 1.5 g of glycine in 418.5 g of water, and then adding 250 g of edible alcohol, 200 g of propylene glycol, and 50 g of glycerin to obtain an antifreeze solution D.

Both antifreeze solution C and D are placed at 4° C. for one month, and their mass are determined. The antifreeze solution D without surfactant volatilized by 16% after one month, while the antifreeze solution C added with the surfactant volatilized by 12%.

Experiment: two antifreeze solution with equal mass are prepared, one is added with 0.2% surfactant, one is without surfactant; the other ingredients are consistent: alcohol 45%; salt 8%; amino acid 0.15%; The two antifreeze solution are open placed at 4° C. for one month and then their mass are determined. The antifreeze solution D without surfactant voltailized by 16% after one month, while the antifreeze solution C added with the surfactant volatilized by 12%.

What is claimed is:

1. An antifreeze solution having less volatilization for food preservation consisting of edible alcohol, propylene glycol, glycerol, calcium chloride, sodium chloride, amino acid, Antarctic krill protein hydrolysate with an average molecular weight of 50-100 KDa, surfactant and water; wherein the antifreeze solution has a minimum freezing point of −45° C.; wherein an enzymatic hydrolysis with papain hydrolyzes Antarctic Krill to obtain an Antarctic krill crude protein hydrolysate solution; wherein the solution is sequentially passed through an ultrafiltration membrane with membrane pore molecular weight of 100 KDa and a membrane pore molecular weight of 50 KDa to obtain the protein hydrolysate with an average molecular weight of 50 KDa to 100 KDa: wherein the surfactant is polysorbate-20; and wherein each component of the antifreeze solution is food grade, and the mass percentage of each component is as follows:

| | |
|---|---|
| edible alcohol | 15%-30% |
| propylene glycol | 10%-30% |
| glycerol | 2%-15% |
| calcium chloride | 1%-10% |
| sodium chloride | 3%-4% |
| amino acid | 0.1%-0.15% |
| Antarctic krill protein hydrolysate | 0.01%-0.3% |
| Surfactant | 0.005%-0.5% |
| water | balance. |

2. The antifreeze solution according to claim 1, wherein the enzymatic hydrolysis condition with the papain enzyme in an amount of 1000 U/g protein is for 3 hours at 40° C. and pH 6.5.

3. The antifreeze solution according to claim 1, wherein the amino acid selected from the group consisting of glycine, alanine and arginine.

4. The antifreeze solution according to claim 1, wherein the propylene glycol has a mass percentage of 10%-20%.

5. The antifreeze solution according to claim 1, wherein the glycerin has a mass percentage of 2%-5%.

6. The antifreeze solution according to claim 1, wherein the calcium chloride has a mass percentage of 1%-5%.

7. The antifreeze solution according to claim 1, wherein the propylene glycol has a mass percentage of 10%-20%, the glycerin has a mass percentage of 2-5%, and the mass percentage of calcium chloride is 1%-5%.

* * * * *